(12) United States Patent
Brody

(10) Patent No.: US 6,412,367 B1
(45) Date of Patent: Jul. 2, 2002

(54) MOUNTING STRUCTURE FOR A HYDROSTATIC UNIT

(75) Inventor: Calvin Lynn Brody, Denver, IA (US)

(73) Assignee: Deere & Company, Moline, IL (US)

( * ) Notice: Subject to any disclaimer, the term of this patent is extended or adjusted under 35 U.S.C. 154(b) by 4 days.

(21) Appl. No.: 09/733,854

(22) Filed: Dec. 8, 2000

(51) Int. Cl.$^7$ .................................................. F16H 5/02
(52) U.S. Cl. ........................................................ 74/606 R
(58) Field of Search .......................... 74/606 R, 730.1; 184/6.12, 1.5; 403/365, 367, 368, 372, 384, 408.1; 411/339, 351; 267/156, 160

(56) References Cited

U.S. PATENT DOCUMENTS

| | | | | |
|---|---|---|---|---|
| 4,119,178 A | * | 10/1978 | Hass | 184/1.5 |
| 4,348,140 A | * | 9/1982 | Bergholz et al. | 411/103 |
| 4,702,658 A | * | 10/1987 | Salter | 411/426 |
| 5,107,808 A | * | 4/1992 | Mahn et al. | 123/195 C |
| 5,345,839 A | | 9/1994 | Nett et al. | |
| 5,803,686 A | * | 9/1998 | Erbes et al. | 411/55 |

* cited by examiner

Primary Examiner—David A. Bucci
Assistant Examiner—Timothy McAnulty

(57) ABSTRACT

A hydrostatic unit is mounted in a transmission housing by a plurality of mounting pins supporting and positioning the hydrostatic unit in the transmission housing. The pins each have a stud portion projecting into a bore in the case of the hydrostatic unit. An externally threaded portion of the pin is threaded into a bore in the transmission housing to mount the pin to the transmission housing. A flange on the pin extends radially outward to overlie and engage the transmission housing surrounding the bore to limit the extent to which the pin is threaded into the transmission housing with the stud projecting into the interior of the transmission housing. Each stud is thus positioned relative to the transmission housing whereby the hydrostatic unit is supported and positioned within the transmission housing. A resilient bushing surrounding the stud serves to isolate the hydrostatic unit from the transmission housing to reduce sound and vibrations transmitted to the transmission housing.

8 Claims, 2 Drawing Sheets

MOUNTING STRUCTURE FOR A HYDROSTATIC UNIT

BACKGROUND OF THE INVENTION

1. Field of the Invention

The present invention relates to a mounting structure for a hydrostatic unit and in particular to a mounting structure for mounting a hydrostatic unit within a larger transmission housing.

2. Description of Related Art

When mounting a hydrostatic unit within a transmission housing, it is desirable to isolate the hydrostatic unit from the housing to avoid transmission of noise and vibration from the hydrostatic unit to the transmission housing. One method of doing so is disclosed in U.S. Pat. No. 5,345,839 where the hydrostatic unit is supported on transversely spaced rods. The rods extend through and are supported by the transmission housing. At each of the rod ends, a rubber bushing is provided between the rod and the transmission housing to reduce the noise transmitted from the hydrostatic unit. A problem with this design is that the support rods require additional space within the overall structure of the transmission housing. Furthermore clamping bores are formed in the hydrostatic unit that fit over the support rods and clamp thereto. Tightening of the clamps onto the rods requires additional hardware and is difficult to assemble, as it must be done inside the transmission housing.

SUMMARY OF THE INVENTION

Accordingly, it is an object of the present invention to provide a mounting structure for the hydrostatic unit that maintains or improves the noise and vibration isolating characteristics while reducing the space necessary for the mounting structure.

It is further object of the invention to provide a mounting structure that enables the hydrostatic unit to be mounted in the transmission housing without requiring the assembler to reach into the interior of the transmission housing to install or tighten fasteners inside the transmission housing.

The mounting structure of the present invention uses a plurality of mounting pins supporting and positioning the hydrostatic unit in the transmission housing. The pins each have a stud portion projecting into a bore in the case of the hydrostatic unit. An externally threaded portion of the pin is threaded into a bore in the transmission housing to mount the pin to the transmission housing. A flange on the pin extends radially outward to overlie and engage the transmission housing surrounding the bore to limit the extent to which the pin is threaded into the transmission housing. The stud is thus positioned relative to the transmission housing whereby the hydrostatic unit is supported and positioned within the transmission housing.

The mounting pins are also provided with an O-ring groove to receive an O-ring. The O-ring seals the transmission housing against leaks and contamination.

Preferably two mounting pins are provided on each side of the transmission to fully support and position the hydrostatic unit within the transmission housing. The pins have an internal socket to drive the mounting pins into the transmission housing. The internal socket reduces the projection of the mounting pins beyond the surface of the transmission housing to facilitate packaging of the transmission within a vehicle structure.

DESCRIPTION OF THE PREFERRED EMBODIMENTS

Figure 1:
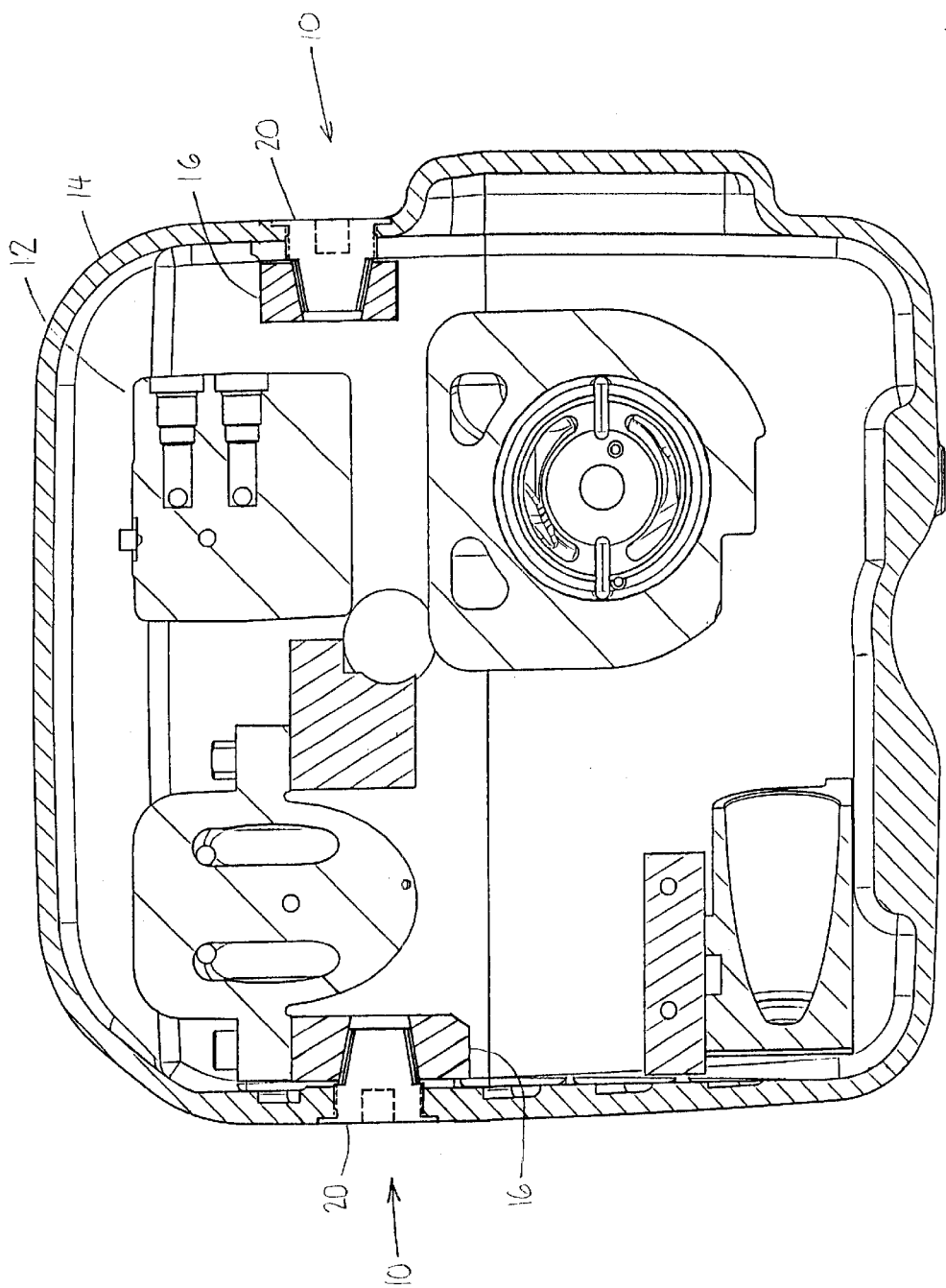
FIG. 1 is a sectional view of a hydrostatic unit mounted within a transmission housing according to the present invention.

The mounting structure of the present invention is shown in detail in the figures and designated generally at 10. The mounting structure 10 is used to mount a hydrostatic unit 12 within a transmission housing 14. The hydrostatic unit 12 has a case 16 via which the hydrostatic unit is mounted in the transmission housing. The mounting system consists primarily of a mounting pin 20 or 20(a). The mounting pin is shown in greater detail in FIGS. 2 and 3.

Figure 2:
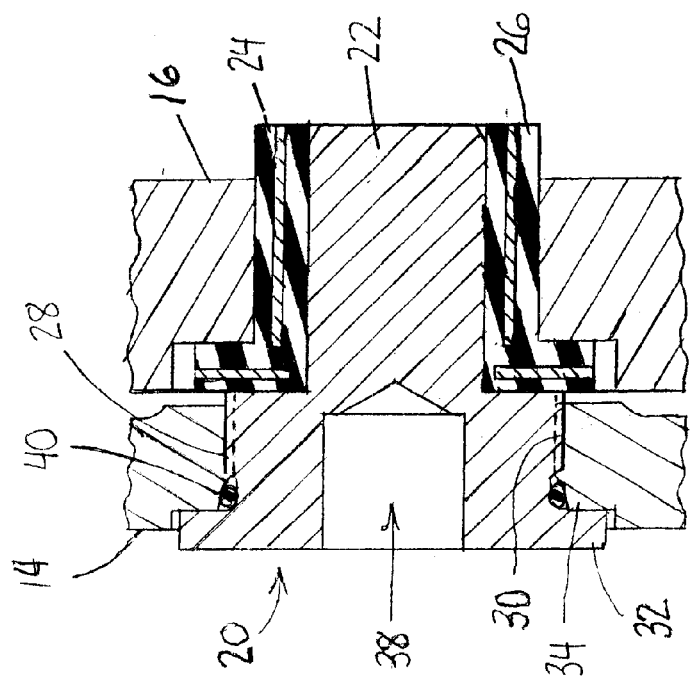
FIG. 2 is an enlarged sectional view of the mounting structure.

With reference to FIG. 2, the mounting pin 20 includes a cylindrical stud portion 22 that extends into a bore 24 in the hydrostatic unit case. A composite rubber and metal bushing 26 surrounds the stud and is positioned between the stud portion 22 and the case 16.

The pin 20 further has an externally threaded portion 28 that is threaded into the internally threaded bore 30 in the transmission housing. This mounts the pin 20 to the transmission housing. To control the extent to which the pin is threaded into the transmission housing, the pin 20 has an flange 32 extending radially outward that overlies and engages the outer surface 34 of, the transmission housing surrounding the threaded bore 30. The mounting pin is formed with a socket 38 recessed into the pin and shaped to receive a tool to rotate the pin to thread it into or out of the transmission housing.

Between the threaded portion 28 and the outer flange 32, the pin and the transmission housing are formed with a groove to receive an O-ring 40. The O-ring provides a seal to prevent leaks from the transmission housing or contamination from entering into the transmission housing.

Figure 3:
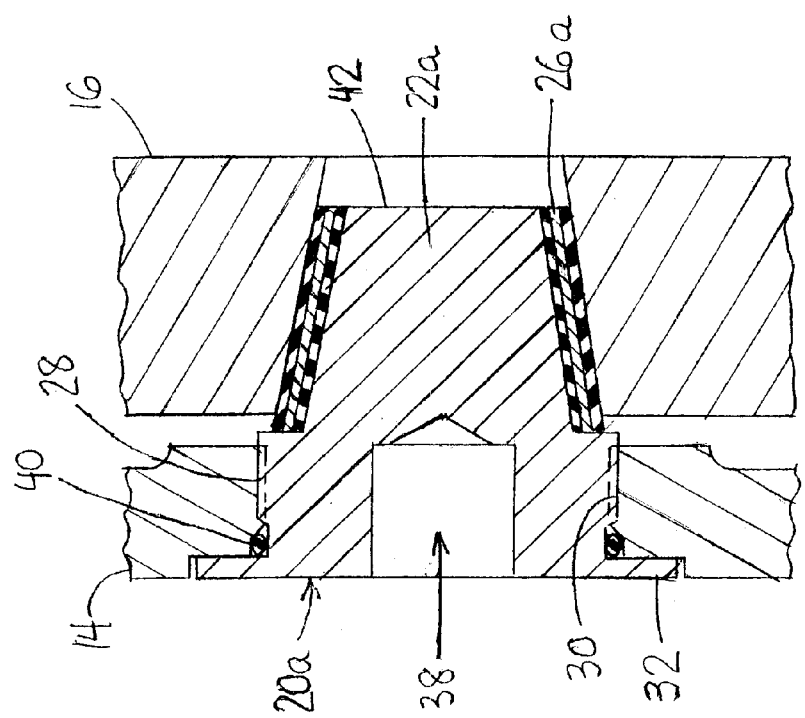
FIG. 3 is an enlarged sectional view of the mounting structure illustrating an alternative embodiment of the mounting pin.

With reference to FIG. 3, an alternative embodiment of the pin is shown and designated at 20(a). The pin 20(a) has a stud portion 22(a) that is frusto-conical in shape, having a taper leading to the distal end 42 of the stud. A frusto-conical shaped bushing 26(a) surrounds the stud 22(a). The conical shaped stud may provide more precise three-dimensional positioning of the hydrostatic unit in the transmission housing but may be more difficult to manufacture.

The mounting system of the present invention, by using two pins on each side of the transmission and hydrostatic unit, both supports and positions the hydrostatic unit relative to the transmission. The incorporation of resilient bushings between the mounting pin and the hydrostatic unit reduces noise and vibration transmitted from the hydrostatic unit. The mounting pins of the present invention enable the hydrostatic unit to be placed in the transmission housing with the bushings already inserted into the bores in the hydrostatic unit. Once the hydrostatic unit is in place, the pins are threaded into the transmission housing to insert the studs into the bushings.

The invention should not be limited to the above-described embodiment, but should be limited solely by the claims that follow.

I claim:

1. In a transmission having a transmission housing and a hydrostatic unit contained in the transmission housing, the hydrostatic unit having a case, the improvement comprising at least two mounting pins supporting and positioning the hydrostatic unit in the transmission housing, the pins each having a stud portion projecting into a bore in the hydrostatic unit case, an externally threaded portion threaded into a bore in the transmission housing to mount the pin to the transmission housing and a flange extending radially outward beyond the threaded portion overlying and engaging the transmission housing surrounding the bore therein to limit the extent to which the pin is threaded into the transmission housing with the stud projecting into the interior of the transmission housing whereby the hydrostatic unit is supported and positioned within the transmission housing.

2. The transmission as defined by claim 1 further comprising a resilient bushing surrounding the stud and located between the stud and the hydrostatic unit casing.

3. The transmission as defined by claim 1 wherein the stud is substantially cylindrical.

4. The transmission as defined by claim 1 wherein the stud is substantially frusto-conical.

5. A hydro-mechanical transmission comprising:

a transmission housing;

a hydrostatic unit having a case, the hydrostatic unit being disposed within the housing; and a plurality of mounting pins coupled to the housing and extending into the interior thereof to support and position the hydrostatic unit therein, the pins each having a stud portion extending into a bore in the hydrostatic unit casing, a threaded portion threaded into a threaded bore in the transmission housing and an outer flange overlying and engaging the housing surrounding the threaded bore to limit the extent to which the pin is threaded into the transmission housing.

6. The transmission as defined by claim 5 further comprising a resilient bushing surrounding the stud and located between the stud and the hydrostatic unit casing.

7. The transmission as defined by claim 5 wherein the stud is substantially cylindrical.

8. The transmission as defined by claim 5 wherein the stud is substantially frusto-conical.

\* \* \* \* \*